UNITED STATES PATENT OFFICE.

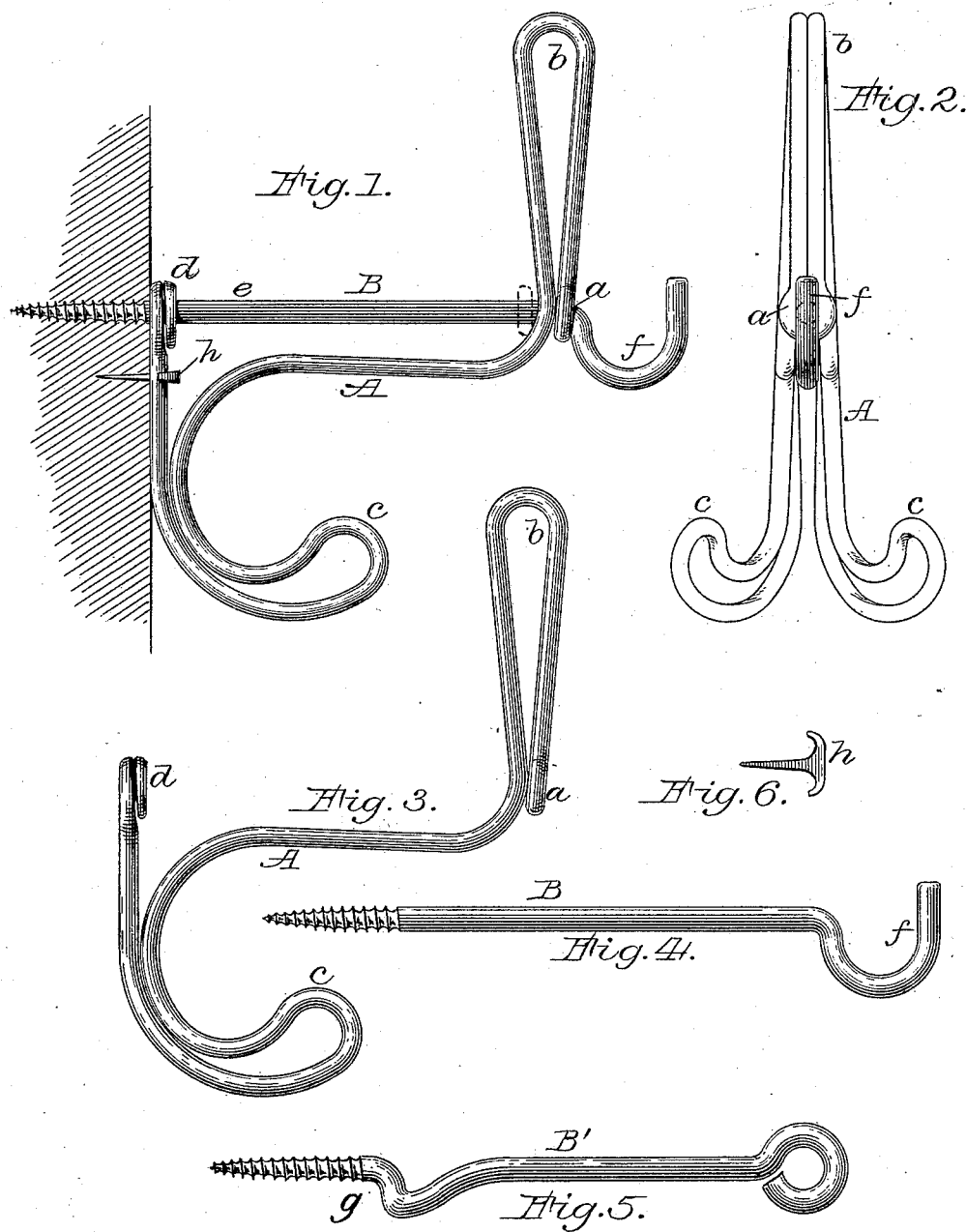

PURCHES MILES, OF BROOKLYN, NEW YORK.

HOOK.

SPECIFICATION forming part of Letters Patent No. 396,757, dated January 29, 1889.

Application filed May 29, 1888. Serial No. 275,415. (No model.)

*To all whom it may concern:*

Be it known that I, PURCHES MILES, of Brooklyn, in the county of Kings and State of New York, have invented certain new and useful Improvements in Hat and Coat Hooks; and I do hereby declare that the following specification, taken in connection with the drawings furnished, and forming a part thereof, is a clear, true, and complete description of my invention.

My said improvements are restricted to hat and coat hooks composed of wire, and in their best form said hooks are of that variety which may be termed "complex wire hooks," in that they embody two separate hooks, one or both of which serves as one or more hooks, and in which one of said separate hooks serves as a support for the other, but in a less desirable form these hooks are permanently united— as, for instance, by soldering or brazing—and one of said hooks may be dispensed with and a mere supporting-arm used in lieu thereof.

My complex hooks contain, as the principal novel feature, a main hook composed of a continuous length of wire doubled upon itself, and then again in part doubled to form a vertical loop composed of four portions of the wire and serving as a high arm or hat-hook at the outer end and having an eye at the foot of said arm, and also bent to form a pair of underlying coat-hooks, each composed of two portions of the wire, and then still further bent to develop a pendent shank, having at its top an eye which is in line with the before-mentioned eye which is at the foot of the vertical hook or arm. This main hook can only be mounted for efficient service by means of a supporting-arm long enough to occupy said eyes, and this is inserted into the material on which the hook is to be mounted; but in its best form this supporting-arm is also a wire hook, having a long shank, preferably provided with a screw-threaded tip, so that the complex hook will then have the vertical arm or hat-hook and three additional hooks for other duty. With the main and the supporting hook considered as separate hooks the complex hook can be mounted without liability of defacing the surface of a hat-rack frame—for instance, because the main hook can be held in a fixed position while the securing-hook is being driven into the wood; but if said arm and the main hook be permanently united the hook, as a whole, can then be applied with no greater liability of abrasion of such surfaces than with any of the common forms of wire hooks having screw-threaded shanks.

To more particularly describe my invention, I will refer to the accompanying drawings, in which—

Figures 1 and 2 respectively represent in side and front views one of my hooks. Fig. 3 represents the main hook detached. Fig. 4 represents the securing-hook detached. Fig. 5 illustrates a securing-arm for use in lieu of the securing-hook. Fig. 6 illustrates a stud sometimes used with my hook.

The main hook A is composed of a continuous length of wire, doubled upon itself midway of its length, and developing an eye, as at $a$; and also again in part doubled upon itself, forming a vertical loop or arm, $b$, composed of four portions of the wire, thus affording a symmetrical arm of great strength to serve as a hat-hook, said eye $a$ being at its base and at the front side thereof. From said base the two portions of the wire are bent and curved rearward, downward, and forward to form the two coat-hooks $c$ $c$, each of these being composed of two portions of the wire, as clearly shown. The two terminals of the wire at the rear of the hooks $c$ $c$ are bent rearward and upward to form a pendent shank having at its upper end an eye, $d$, which in this instance is a double eye, in that each terminal is bent to form an eye, one in front of the other; but it is immaterial how the eye is formed, and I sometimes bend the wire of one terminal to form the eye proper, and then inclose this eye by another larger one, which is formed of the wire of the other terminal, so that such two eyes are in the same vertical plane; but, however formed, this eye $d$ at the top of the shank should be in line with the eye $a$ at the front end of the hook.

The securing-arm B is also composed of wire and has a straight shank, $e$, which is preferably screw-threaded at its tip and occupies said eyes $a$ and $d$, so that when the hook is mounted in position for service it will be well supported by said arm. In its best form this arm at its outer end is bent to form a hook, *f*, which also serves as a head on the arm for engaging with the main hook, and clamping it between said head and the surface on which the complex hook is mounted. In Fig. 5 said arm B has a head in the form of an eye, by which it can be readily manipulated for driving it into the wood on which it is to be mounted. It will be observed that when the hook of the arm B is used that a heavy coat, for instance, cannot unduly deflect the arm, because of the bracing effect of the lower portion of the main hook and its abutment against the surface on which the hook is mounted, so that while the main hook is wholly supported on said hook-arm, the latter is also supported and strengthened by said main hook.

It will also be seen that the main hook need not be rotated, and hence abrasion of the surface on which it is mounted may be wholly obviated; but if the arm and main hook be permanently united—as, for instance, by soldering or brazing—the hook as a whole can be mounted like any ordinary wire hook accompanied by the usual liability of defacing said surface. When hooks of special rigidity are desired, I provide the arm B or B′ with a bend accurately located at a proper point near the threaded tip, as at *g*, Fig. 5, so that a suitable shoulder will be formed for abutting against the eye *d* of the main hook for more rigidly confining it in position.

It will be sometimes desirable to employ with these hooks puncturing studs or screws applied to the wood below the eye *d*, so as to more securely confine the main hook against axial derangement. A desirable variety of stud *h* is illustrated in Fig. 6, it being T-shaped, but with its arms so curved or bent downwardly that they may laterally embrace and firmly confine the two portions of the wire in the shank, as indicated in Fig. 2.

It will be seen that these hooks can be manufactured at low cost, both as to labor and metal, and that when the latter is of desirable color or gilded the hooks will be highly ornamental in their character and well suited for use upon even the most elaborate hall-racks.

It will be obvious that it is not essential that the supporting-arm be detachable from the main hook in order that said arm may be rotative—as, for instance, an open wire ring may be firmly clinched upon said arm at the rear of the hat arm or hook, as clearly indicated in dotted lines in Fig. 1. It will still further be obvious that the supporting-arm may have in lieu of its screw-threaded tip a drive screw-thread or the barbed serrations common to the best forms of wire nails, so that the hooks may be mounted by means of a hammer, and I contemplate the use of that variety of arm as well as a straight screw-thread and a nut upon the arms of some of the finer qualities of my hooks for use upon expensive hat-racks and in other connections wherein access is available at the rear of the surface on which the hooks are to be mounted.

Having thus described my invention, I claim as new and desire to secure by Letters Patent—

1. A hat and coat hook composed of a continuous length of wire and having a vertical hat-hook arm containing four portions of the wire and provided with an eye at its base, and below and at the rear of said arm coat-hooks containing two portions of the wire and having a vertical shank provided at its top with an eye in line with the eye at the base of the hat-hook arm, substantially as described, said eyes being adapted to receive a supporting-arm for attaching the hook to any suitable foundation.

2. A hat and coat hook composed of a continuous length of wire and having a vertical hat-hook arm composed of four portions of said wire and provided with an eye at its base, and below and at the rear of said arm coat-hooks having a vertical shank provided at its top with an eye in line with the eye at the base of the hat-hook arm, in combination with a supporting-arm which occupies said eyes and has a hook at its outer end, substantially as described.

PURCHES MILES.

Witnesses:
C. T. STORK,
A. A. FONDA.